United States Patent
Shimizu

(10) Patent No.: US 6,331,894 B1
(45) Date of Patent: *Dec. 18, 2001

(54) PATTERN OUTPUT APPARATUS AND METHOD FOR CONVERTING FORM DATA AND INPUT DATA TO INTERMEDIATE DATA TO FORM AN OVERLAY PATTERN

(75) Inventor: Masaaki Shimizu, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/901,284

(22) Filed: Jul. 29, 1997

Related U.S. Application Data

(63) Continuation of application No. 08/361,655, filed on Dec. 22, 1994, now abandoned.

(30) Foreign Application Priority Data

Dec. 27, 1993 (JP) .................................................. 5-331096

(51) Int. Cl.[7] .................................................. G06F 15/00
(52) U.S. Cl. .................................................. 358/1.13; 345/435
(58) Field of Search .................. 358/1.1, 1.6, 1.9, 358/1.13, 1.14, 1.15; 395/101, 106, 109, 112, 113, 114; 345/418, 435, 467, 470, 471; 707/500, 503, 505, 506, 507, 508, 516, 517, 522, 908, 911

(56) References Cited

U.S. PATENT DOCUMENTS

| | | | |
|---|---|---|---|
| 4,944,614 | * 7/1990 | Tanaka | 400/68 |
| 5,050,101 | 9/1991 | Kiuchi et al. | 364/519 |
| 5,067,024 | * 11/1991 | Anzai | 358/296 |
| 5,104,245 | * 4/1992 | Oguri et al. | 400/68 |
| 5,119,465 | * 6/1992 | Jacu et al. | 395/550 |
| 5,332,320 | * 7/1994 | Ohara | 395/112 |
| 5,388,920 | * 2/1995 | Ohara | 400/76 |
| 5,465,165 | * 11/1995 | Tanio et al. | 358/448 |
| 5,469,373 | * 11/1995 | Kashiwazaui et al. | 364/550 |
| 5,530,793 | * 6/1996 | Watkins et al. | 395/117 |

FOREIGN PATENT DOCUMENTS

| | | | |
|---|---|---|---|
| 3922276 | 1/1990 | (DE) | G06F/15/21 |
| 2-136918 | 8/1990 | (JP) | G06F/3/12 |
| 5-119937 | 9/1993 | (JP) | G06F/3/12 |

OTHER PUBLICATIONS

"Word Processors That Build Character", H. Eglowstein, et al., Byte, Sep. 1990, pp. 132–152.

* cited by examiner

Primary Examiner—Gabriel I. Garcia
(74) Attorney, Agent, or Firm—Fitzpatrick, Cella, Harper & Scinto

(57) ABSTRACT

A pattern output apparatus and a pattern output method, in which data received from an external apparatus such as a host computer is developed to bit map pattern data on a page unit basis as output information and the bit map pattern data is output. The pattern output apparatus comprises a converter for converting form data to intermediate data, a memory to store the form data converted to the intermediate data by the converter, and an output controller for converting input data which is input from an external apparatus to intermediate data, for producing a pattern based on the input data converted to the intermediate data and the form data stored in the memory, and for outputting the pattern. The input data and the form data are expressed by different command systems. The intermediate data has a data format peculiar to the pattern output apparatus.

15 Claims, 13 Drawing Sheets

|  | aaa | abcd | xyz |
|---|---|---|---|
| AAA | 1025 | 東京 | abcd |
| BBB | −10 | 仙台 | あい |
| CCC | 10006 | 東京 | A10 |
| DDD | 60155 | 京都 | A20 |
| EEE | −0.56 | 東京 | 333 |
| FFF | −2259 | 東京 | abcd |
| GGG | 156.009 | 札幌 | abcd |
| HHH | −999 | 東京 | B15 |
| III | 999999 | 福岡 | ABC |
| JJJ | 0 | 名古屋 | zzz |
| KKK | 4057 | 名古屋 | mak |

302 (empty table)

303

|  | aaa | abcd | xyz |
|---|---|---|---|
| AAA | 1025 | 東京 | abcd |
| BBB | −10 | 仙台 | あい |
| CCC | 10006 | 東京 | A10 |
| DDD | 60155 | 京都 | A20 |
| EEE | −0.56 | 東京 | 333 |
| FFF | −2259 | 東京 | abcd |
| GGG | 156.009 | 札幌 | abcd |
| HHH | −999 | 東京 | B15 |
| III | 999999 | 福岡 | ABC |
| JJJ | 0 | 名古屋 | zzz |
| KKK | 4057 | 名古屋 | mak |

PATTERN OUTPUT APPARATUS AND METHOD FOR CONVERTING FORM DATA AND INPUT DATA TO INTERMEDIATE DATA TO FORM AN OVERLAY PATTERN

This application is a continuation, of application Ser. No. 08/361,655 filed Dec. 22, 1994 now abandoned.

BACKGROUND OF THE INVENTION

1. Field of the Invention

The present invention relates to a pattern output apparatus such as a printing apparatus or the like and a pattern output method, in which data received from an external apparatus such as a host computer or the like is developed as output information and converted to bit map pattern data of a page unit and the bit map pattern data is output.

2. Related Background Art

Hitherto, such type of printing apparatus uses a general method whereby bit map pattern data of one page is developed into an image memory on the basis of input data (printer language such as a PDL or the like comprising a character code, a control code, and the like) received from a host computer and the result of the development in a image memory is converted to the video signal and is transferred to a printer mechanism section.

A printing apparatus in which a plurality of print command systems are supported in one printing apparatus is generally well known.

It is also known that separately from input data, form data is transmitted from the host computer and is registered in the printing apparatus and the registered form is overlapped with the input data, thereby forming an output form overlay pattern.

In this instance, in the case where the form to be overlaid on each page is the same form, when the form data is transmitted for every page, it takes up data transfer time of the host computer. Therefore, generally, before the input data is transmitted, the form data is registered in a memory (for example, RAM) of the printing apparatus and the form data which has once been registered is held until a deletion is instructed by the host computer or a power source is turned off. By merely instructing that the form is to be overlaid on the input data at any time, it is possible to easily overlap the input data and the form, and to form and output a form overlay pattern.

Further, by adding a secondary memory device such as a hard disc or the like to the printing apparatus and by registering form data in the secondary memory device, a number of types of form data may be registered into the printing apparatus. Even if the power source is turned off, the registered form data is not lost.

Consequently, for the form data which has once been registered in the secondary memory device, by merely inputting a command (instruction information) to instruct a form to be overlaid on the input data which is sent from the host computer, it is possible to easily overlap the received input data and the form stored in the secondary memory device and to produce and output a form overlay pattern at any time irrespective of the on/off operation of the power source.

A method whereby the form data is registered into the secondary memory device and a printing process is executed as mentioned above is becoming a generally known method.

In such a printing apparatus, in the case where the input data and the registered form are overlaid and the form overlay pattern is produced and output, generally, command systems (for example, types PDL) of the input data and the form have to be identical.

That is, the command system of the input data and the command system of the form have to be coincident.

The conventional apparatus, therefore, has a problem such that it is impossible to overlap the input data of a command system (A) and the form of a command system (B) and to produce and output a form overlay pattern.

Namely, for example, there is a problem such that although the printing apparatus has the command system (A) which is excellent for a text process (character process) and a command system (B) which is excellent in a graphic process, the result (form overlay pattern) in which the input data and the form are overlaid cannot be output by utilizing merits of those two command systems.

SUMMARY OF THE INVENTION

It is an object of the present invention to provide a pattern output apparatus and a pattern output method, in which by converting print data or form data corresponding to various types of command systems to intermediate print data that is peculiar to a printing apparatus, the print data of a command system (A) and a form of a command system (B) can be overlapped and output.

To solve the above problems as mentioned above, according to the invention, there is provided a pattern output apparatus comprising: converting means for converting form data to intermediate data; memory means for storing the form data converted to the intermediate data by the converting means; and output control means for converting input data that is input from an external apparatus to intermediate data and for producing and outputting a pattern based on the input data converted to the intermediate data and the form data stored in the memory means.

To solve the problems as mentioned above, according to the invention, there is provided a pattern output method comprising the steps of: converting the form data registered in the pattern output apparatus mentioned above and the input data which is input from the external apparatus to the same intermediate data; and producing and outputting a pattern based on the input data converted to the intermediate data and the form data.

BRIEF DESCRIPTION OF THE DRAWINGS

FIG. 3 is a diagram showing a concept of the overlay of input data and a form;

DETAILED DESCRIPTION OF THE PREFERRED EMBODIMENTS

An embodiment of the present invention is described hereinbelow with reference to the drawings.

Figure 1:
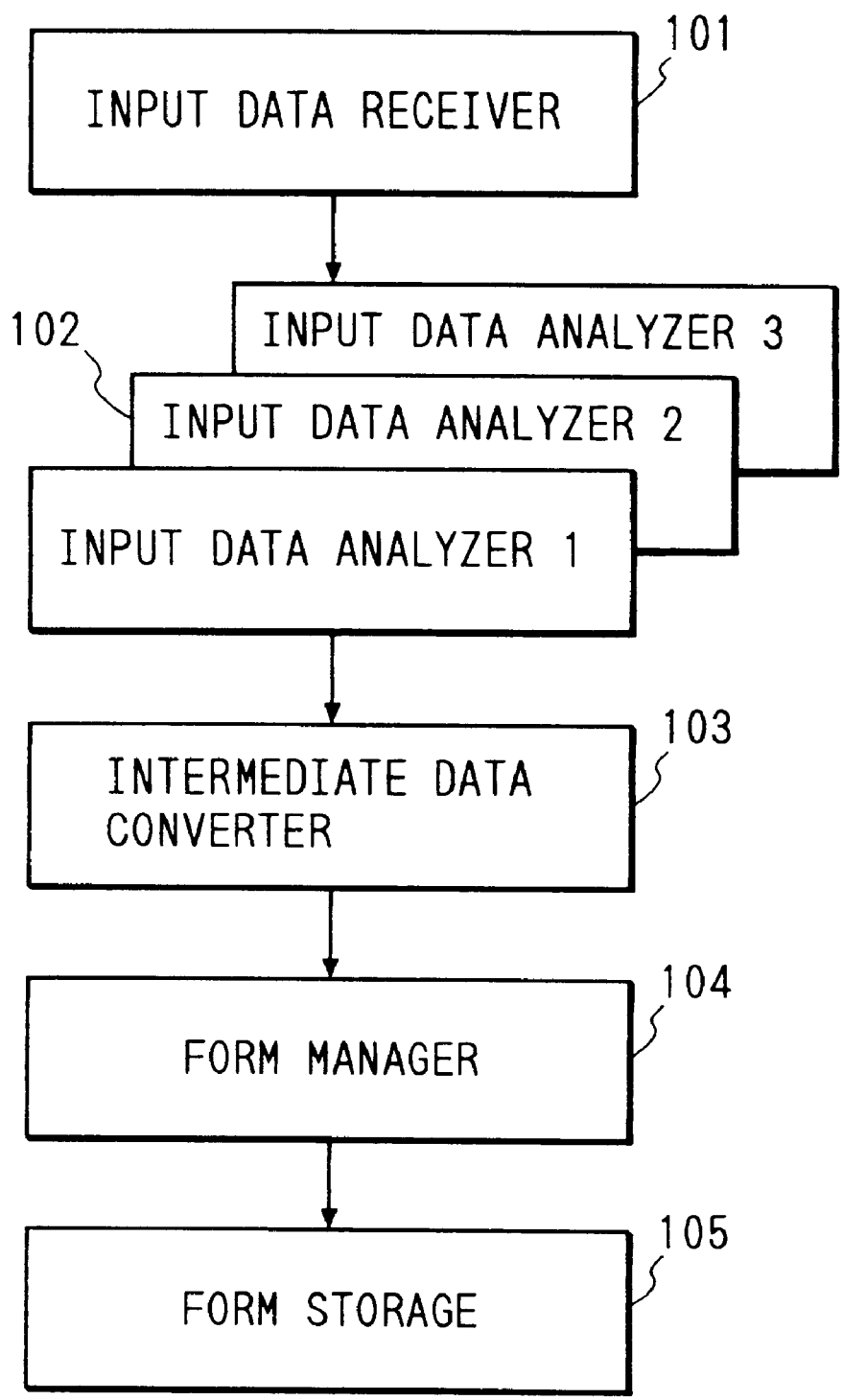
FIG. 1 is a block diagram showing a schematic functional construction of an output apparatus of the invention.
Figure 2:
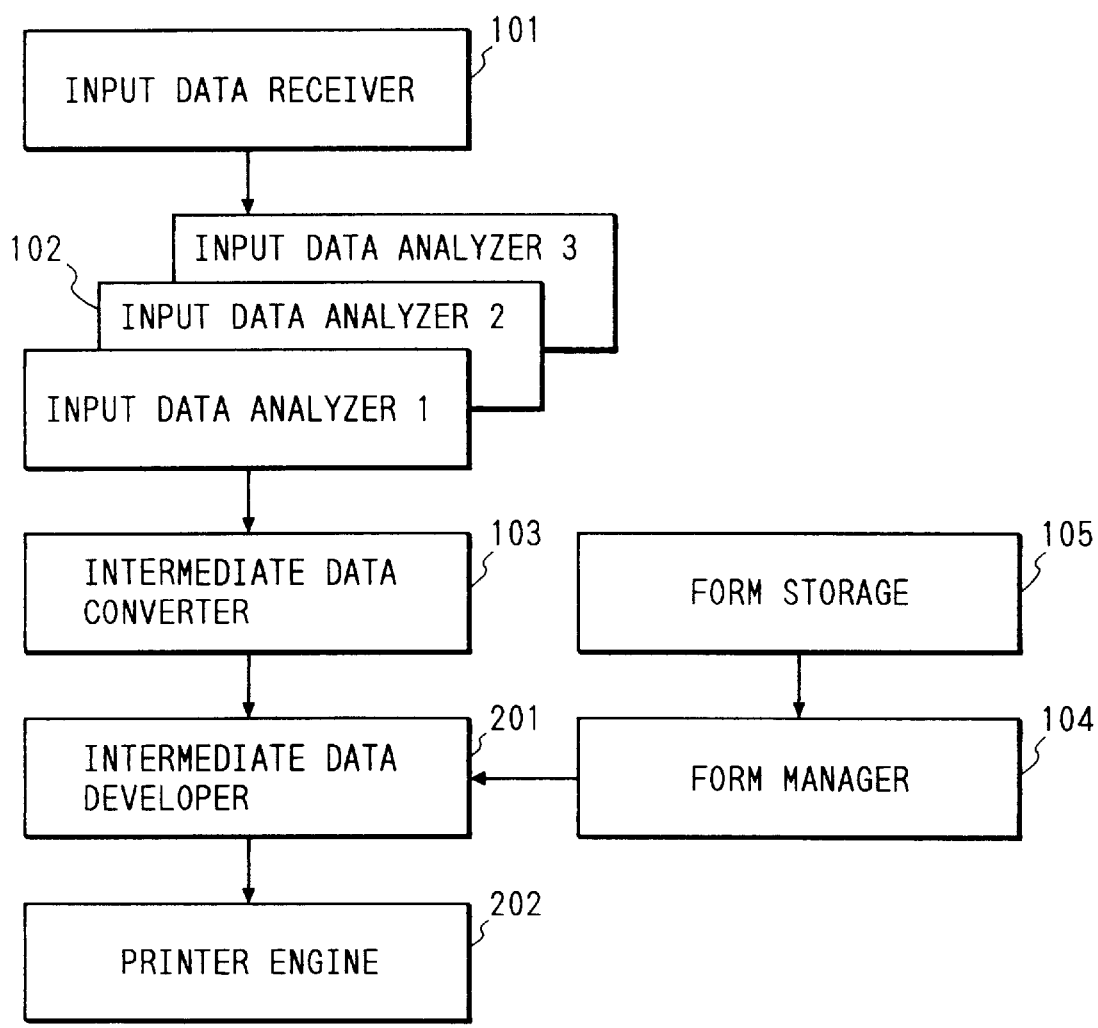
FIG. 2 is a block diagram showing a schematic functional construction of the output apparatus of the invention.

FIGS. 1 and 2 are schematic block diagrams showing the functional construction of a printing apparatus according to the invention.

In FIG. 1, reference numeral 101 denotes an input data receiver for receiving input data (for example, printer language such as a PDL or the like comprising a character code, a control code, and the like) transmitted from a host computer.

The input data comprises: data such as a character code, figure, image, etc. for actually executing a printing process; and a control code for designating a printing position, a size, or the like and for designating a switching control of, for instance, a sheet feed mode (cassette sheet feed, manual sheet insertion), a sheet delivery mode, and a one-side/both-sides printing mode.

Reference numeral 102 denotes an input data analyzer (program) for analyzing input data received by the input data receiver 101. The input data analyzer 102 is built in every command system. The input data analyzer 102 includes: an input data analyzer (A) for analyzing input data (A) (command system A); and an input data analyzer (B) for analyzing input data (B) (command system B).

Reference numeral 103 denotes an intermediate data converter for converting the input data analyzed by the input data analyzer 102 to the intermediate data that is peculiar to the printing apparatus on a page unit basis. The intermediate data denotes data which is obtained by processing the input data so as to easily produce output data (bit map data) from the input data.

Reference numeral 104 denotes a form manager for FIG. 3.

First, FIG. 3 shows a general example of the overlap of input data and a form. In FIG. 3, reference numeral 301 shows a state in which input data transmitted from the host computer is received by the input data receiver 101 and is transmitted through the input data analyzer 102 and intermediate data converter 103 and bit map data is developed in a memory of one page in the intermediate data developer 201. Reference numeral 302 in FIG. 3 shows a state in which the form registered in the form storage 105 by the function shown in FIG. 1 is developed to the bit map data into the memory of one page in the intermediate data developer 201 by the form manager 104.

When the input data 301 is received by the input data receiver 101, the input data 301 comprises the data according to the command system (A) which is excellent for a text process. A command of the input data 301 is analyzed by the input data analyzer 102 corresponding to the command system (A) and the input data 301 is developed to the bit map data of one page.

Similarly, when the form 302 is received by the input data receiver 101, the form 302 comprises the data according to the command system (B) which is excellent for a graphic process. A command of the form 302 is analyzed by the input data analyzer 102 corresponding to the command system (B). The form is registering and managing the intermediate data, as a form, of one page which was converted by the intermediate data converter 103.

Reference numeral 105 denotes a form storage (RAM) to store the forms registered by the form manager 104.

In FIG. 2, the component elements shown by reference numerals 101, 102, 103, 104, and 105 are the same as those shown in FIG. 1.

Reference numeral 201 denotes an intermediate data developer for developing the intermediate data converted from the input data by the intermediate data converter 103 to the output data (bit map data) of one page. The intermediate data developer 201 also develops form information (intermediate data format) stored in the form storage 105 by overlapping the form into the bit map data produced from the input data through the form manager 104.

Reference numerals 101 to 105 and 201 denote functions in a printer controller of the printing apparatus.

Reference numeral 202 in FIG. 2 denotes an actual printing mechanism section (printer engine) comprising: a printing mechanism for performing a print control; and a control mechanism for executing a feeding control of a sheet feeding system (sheet feeding mode, sheet delivery process) in the printer engine.

A fundamental concept of the invention is shown in registered into the form storage 105 as a form in the intermediate data format of one page. After that, the form is developed as bit map data into the memory of one page in the intermediate data developer 201 by the form manager 104.

Reference numeral 303 in FIG. 3 denotes an output result (form overlay pattern) which is actually output by overlapping the bit map data 301 as a character pattern and the bit map data 302 as form data by the intermediate data developer 201 in FIG. 2.

Figure 4:
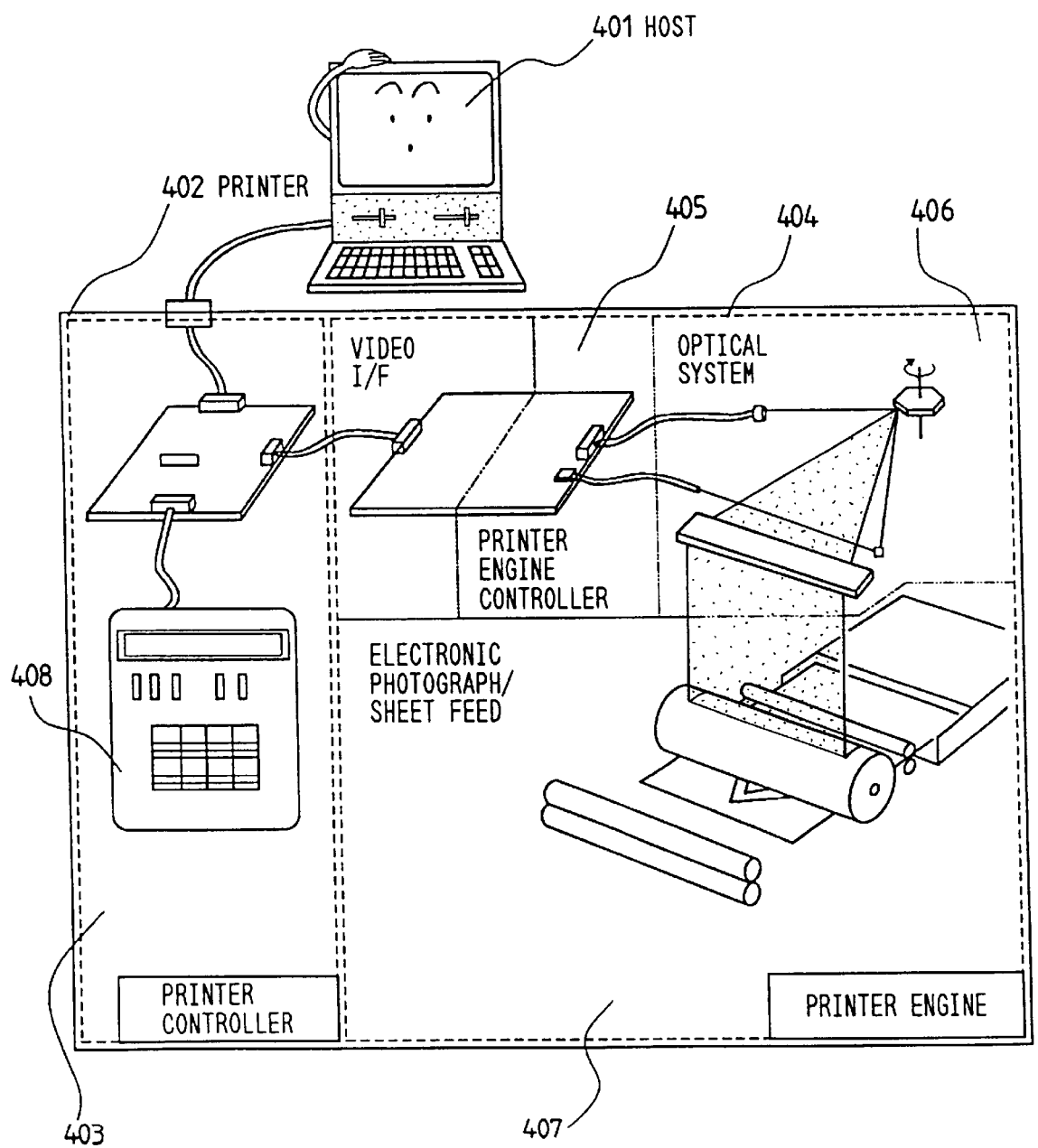
FIG. 4 is a conceptual diagram showing a general construction of a printing apparatus.
Figure 5:
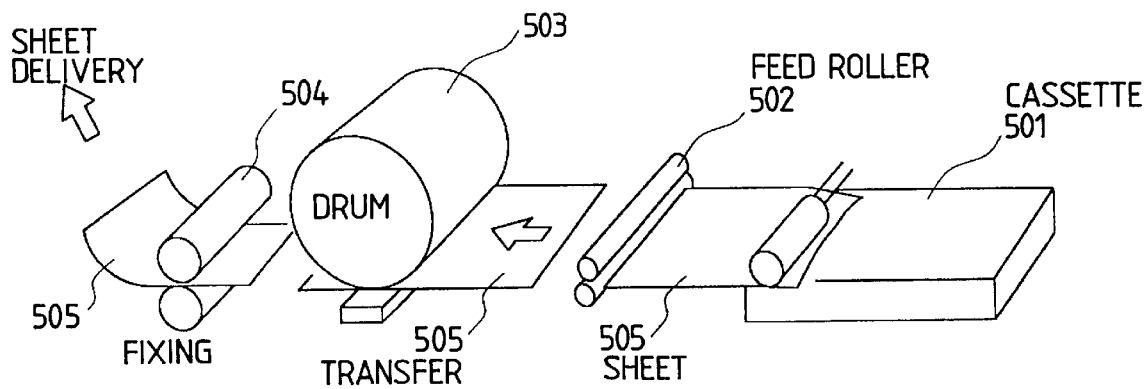
FIG. 5 is a conceptual diagram showing the sheet feeding system 407 in FIG. 4.

FIGS. 4 and 5 show a general construction in the printing apparatus.

Reference numeral 401 in FIG. 4 denotes a host computer for transmitting various input data to the printing apparatus.

In FIG. 4, reference numeral 402 denotes an example of the printing apparatus in the invention (a laser beam printer using a laser beam as a light emitting device is shown here); 403 a printer controller of the printing apparatus; and 404 a printing mechanism unit (printer engine) of the printing apparatus.

In FIG. 4, reference numeral 405 denotes a control section for controlling whole portions in the printer engine 404 of FIG. 4. The control section 405 comprises: a portion for receiving a video signal from the printer controller 403 in FIG. 4, for receiving a control command from the printer controller, and for transmitting status information of the engine to the printer controller; and a portion for controlling an electronic photographing process, the sheet feeding system, and the optical system.

Reference numeral 406 in FIG. 4 denotes an optical system in the printer engine 404 in FIG. 4.

Further, reference numeral 407 denotes the electronic photographing process and sheet feeding system in the printer engine 404 in FIG. 4.

Reference numeral 408 in FIG. 4 denotes an operation panel which inputs a command to designate various operations in the printing apparatus.

FIG. 5 shows a further detailed diagram of the sheet feeding system 407 in FIG. 4.

In FIG. 5, reference numeral 501 denotes a feed cassette and 502 indicates a feed roller to feed sheets from the sheet cassette one by one.

In FIG. 5, reference numeral 503 denotes a photosensitive drum and 504 indicates a fixing unit.

Further, reference numeral 505 in FIG. 5 denotes a feeding state of the sheet in the sheet feeding system.

Figure 6:
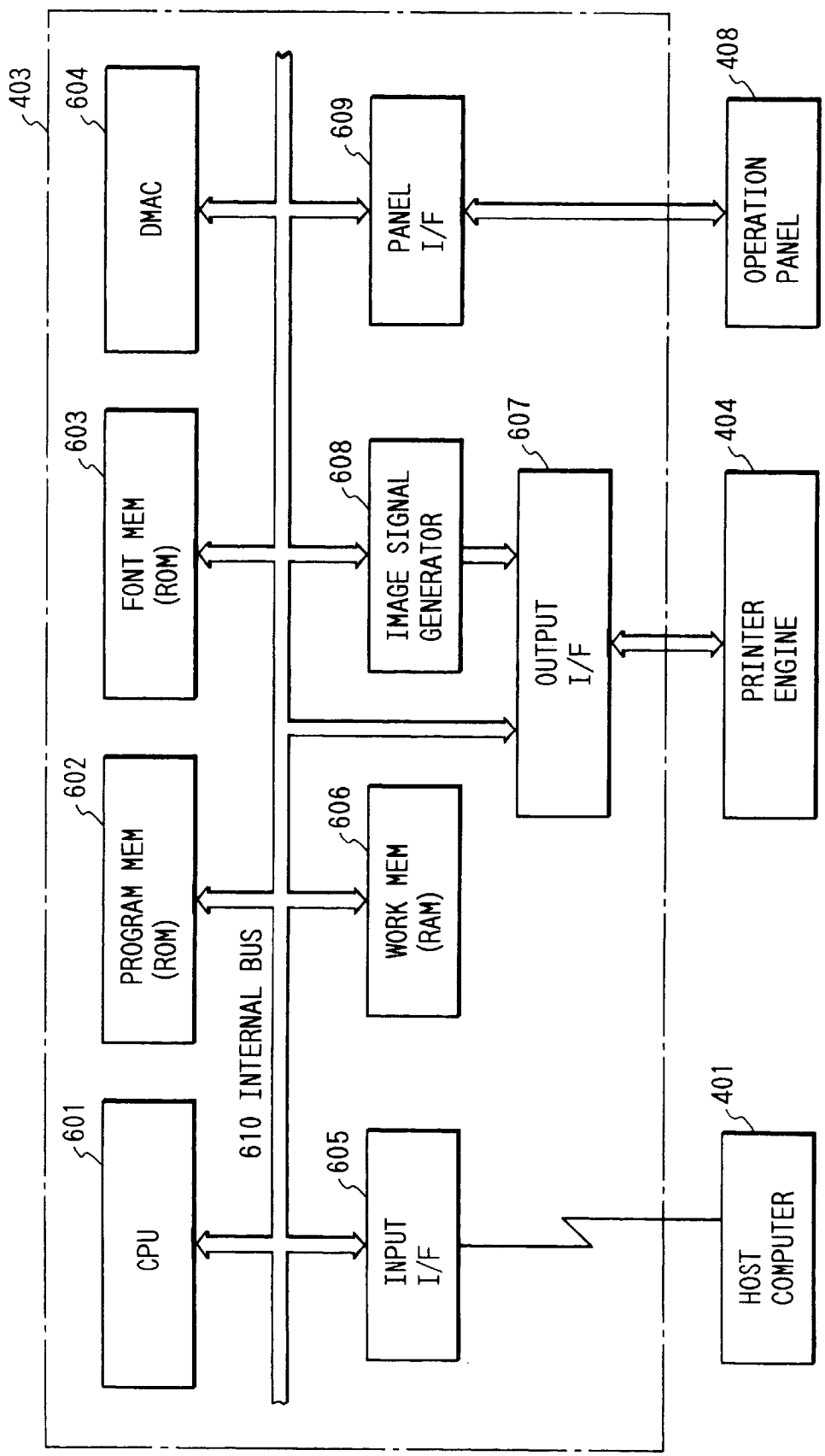
FIG. 6 is a block diagram of the printer controller 403 in FIG. 4.

FIG. 6 shows a block diagram of the printer controller 403 in FIG. 4.

In FIG. 6, reference numeral 601 denotes a central processing unit (CPU) to control the entire printer controller and 602 indicates a program memory in the which programs (including control programs shown in flowcharts of FIGS. 9 and 10, which are described hereinlater) for controlling the printer controller have been stored. For example, the program memory 602 is constructed by a ROM (read only memory). Reference numeral 603 denotes a memory in which font information (dot font, outline font) to develop the character code to the bit map is stored. For example, the memory 603 is constructed by a ROM (read only memory). Reference numeral 604 denotes a hardware circuit for transferring the bit map data obtained by developing the input data to the printer engine. The hardware circuit 604 comprises, for example, a DMAC (direct memory access controller) or a FIFO. Reference numeral 605 denotes a data input interface circuit (hereinafter, simply referred to as an input I/F) for connecting the host computer (401 in FIG. 6) and the printer controller (403 in FIG. 6). Reference numeral 606 denotes a work memory which is necessary for making the control program in the ROM 602 operative. For example, the work memory 606 is constructed by a RAM (random access memory). A storage area of the input data, a development area of the input data, and the like are also provided in the work memory 606. Reference numeral 607 denotes a data output interface circuit (hereinafter, simply referred to as an output I/F) for connecting the printer controller (403 in FIG. 6) and the printer engine (404 in FIG. 6). Reference numeral 608 denotes an image signal generator for generating a video signal from the bit map data developed in the input data development area (606 in FIG. 6) synchronously with the printer engine (404 in FIG. 6). Reference numeral 609 denotes a panel interface circuit (hereinafter, simply referred to as a panel I/F) for connecting the operation panel (408 in FIG. 6) and the printer controller (403 in FIG. 6). Reference numeral 610 denotes an internal bus for connecting each of the above memories and circuits to the CPU 601.

A method of managing the form information in the printing apparatus is described below with reference to data structural diagrams of FIGS. 7 and 8.

First, the form information transmitted from the host computer is converted to intermediate print data and, after that, is stored as form information (703 in FIG. 7) in the work memory (606) in the printing apparatus by an intermediate data format.

Figure 7:
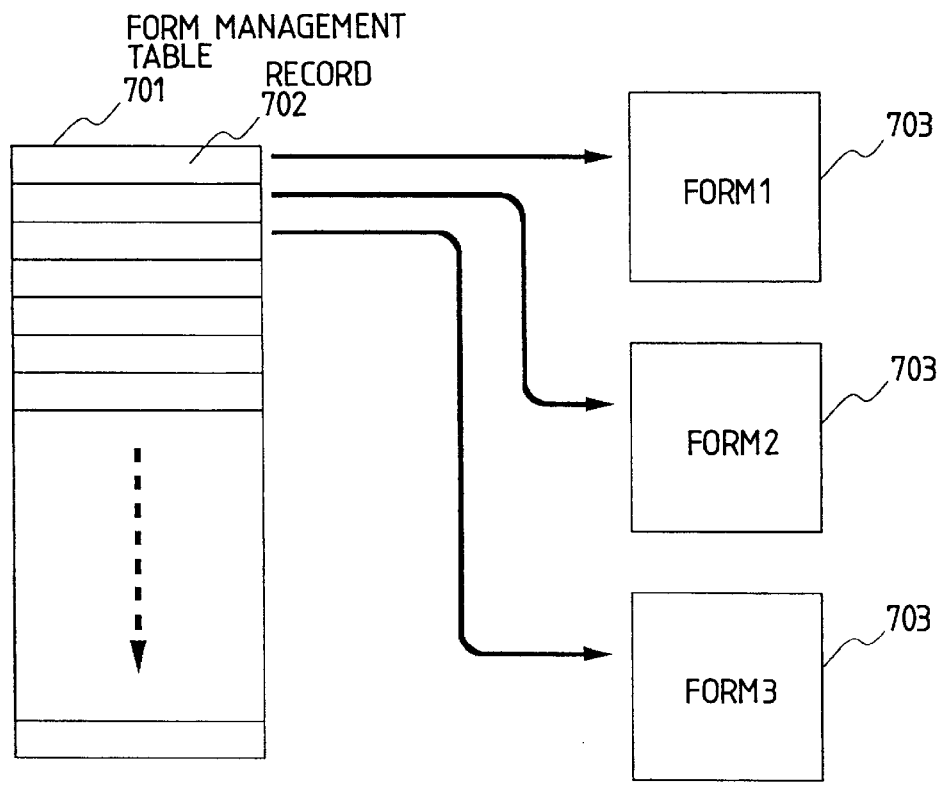
FIG. 7 is a diagram showing a managing method of managing forms registered in the printing apparatus.

The various form information (703 in FIG. 7) stored in the work memory (606) is managed by a form management table (RAM) as shown at 701 in FIG. 7. In FIG. 7, reference numeral 702 denotes a management record for each form information (703 in FIG. 7) in the form management table (701 in FIG. 7).

Figure 8:
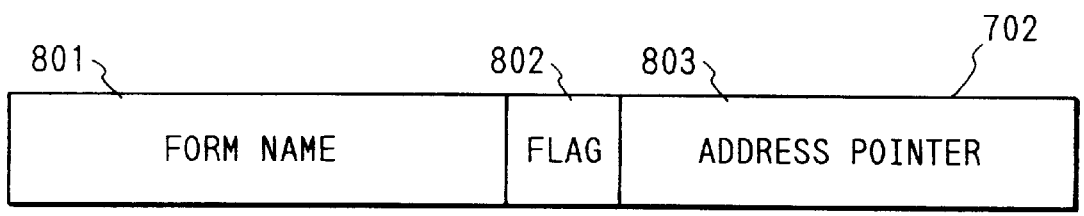
FIG. 8 is a diagram showing an example of a detailed format of a form management record of a form management table.

FIG. 8 shows a detailed format of the management record 702 in FIG. 7. Reference numeral 801 in FIG. 8 denotes a form name designated when the host computer registers the form in the printing apparatus; 802 indicates an ID flag to discriminate whether the management record is valid or invalid; and 803 an address pointer when the form information has been stored in the work memory (606).

A method of registering the form is described below in accordance with the flowchart of FIG. 10.

First, in the case where the form information transmitted from the host computer is registered into the work memory (606) of the printing apparatus, the CPU 601 judges whether or not the form information from the host computer 401 has been received by the input data receiver 101 (step S1).

Figure 9:
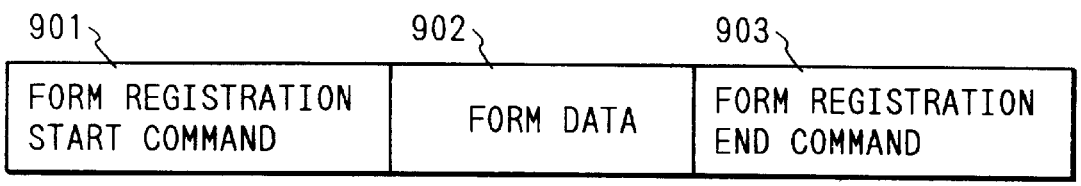
FIG. 9 is a diagram showing a construction of form information.

As shown in FIG. 9, the form information which is received from the host computer 401 is constructed by: a form registration start command 901; form data 902 (comprising form data and ID information indicative of a form name or the like to discriminate the form data); and a form registration end command 903.

The form information differs for each printer language. For example, the form information of a printer language (A) of the command system (A) differs from the form information of a printer language (B) of the command system (B).

The form data comprises: a character code, a figure, or an image; and a control code to designate the printing position and the like.

In step S1, by discriminating whether the form registration start command 901 has been received or not, a check is made to see if the form information has been received or the input data has been received. When it is judged that the form registration start command 901 has been received, the form data 902 is stored in the work memory 606 until the form registration end command 903 is received.

Figure 10:
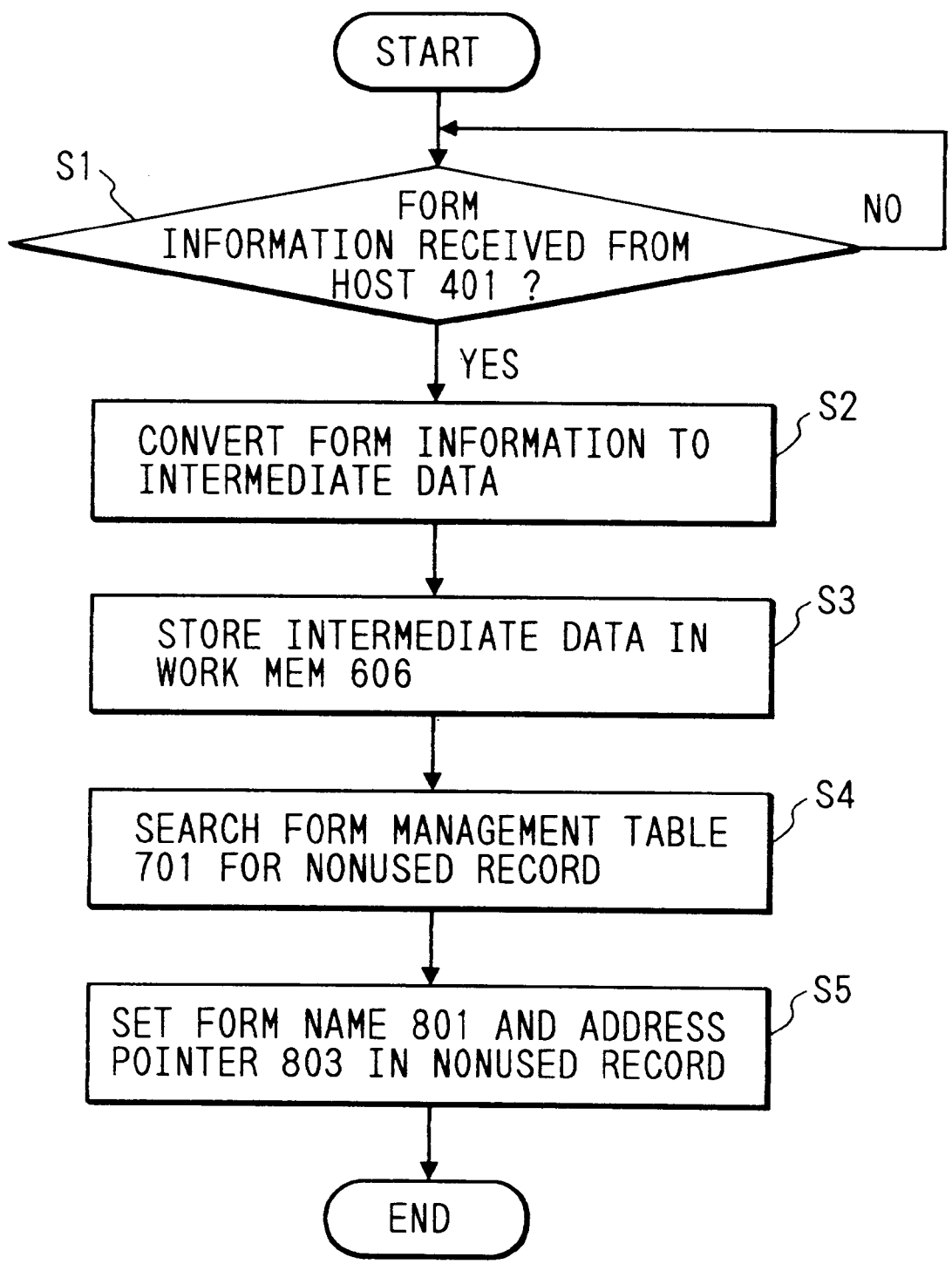
FIG. 10 is a flowchart showing a form registering process.

A process for analyzing the form information is executed by the input data analyzer 102 in accordance with the command system corresponding to the form information received in step S1 and the form information is converted to intermediate data by the intermediate data converter 103 (step S2 in FIG. 10).

The intermediate data converted in step S2 is stored in the work memory (606) (S3 in FIG. 10).

A nonused record in the form management table is searched (step S4 in FIG. 10).

The form name 801 and the address pointer 803 to the work memory are set into the nonused record which was found out in step S4 (step S5 in FIG. 10). The form registering process is now finished.

A method of producing a form overlay pattern by using the form registered in the work memory and outputting it is described below in accordance with the flowchart of FIG. 11.

First, the CPU 601 judges whether or not the input data of one page has been received from the host computer 401 (step S6). If YES, the CPU 601 analyzes the input data in accordance with the command system corresponding to the input data which has been transmitted from the host computer and received by the input data receiver 101. The CPU 601 converts the input data of one page to the intermediate data.

Figure 11:
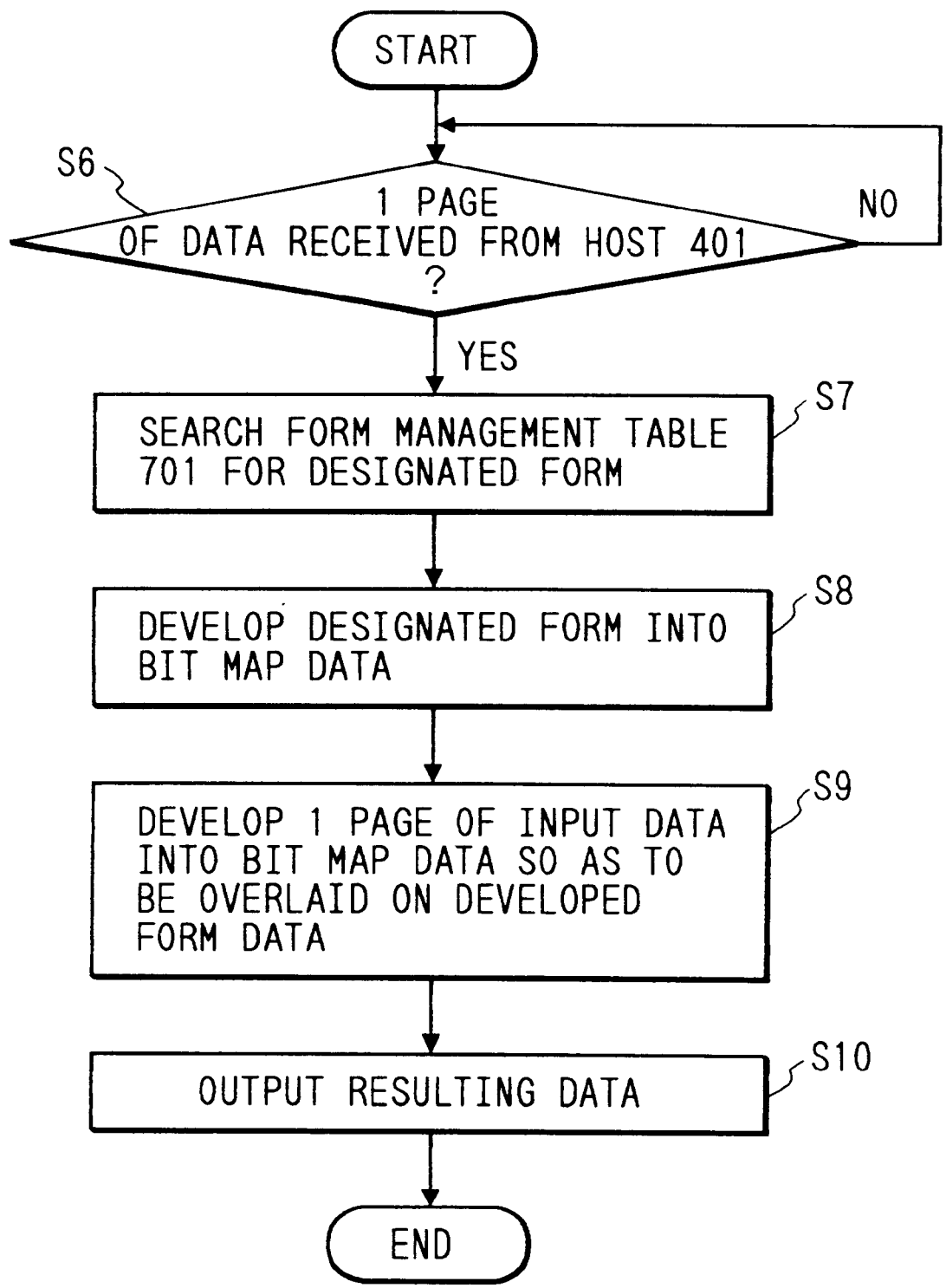
FIG. 11 is a flowchart showing a form overlaying process.

On the basis of designation information which is included in the input data transmitted from the host computer and is used to designate the form, the form registered in the work memory of the printing apparatus is found by searching the form name 801 in the form management record in the form management table (step S7 in FIG. 11).

The form data (form data in the intermediate data format) is subsequently read out by accessing to the address pointer 803 of the form management record of the form file which was found out in step S7 and the form data is actually developed to the bit map data (step S8 in FIG. 11).

The intermediate data obtained by converting the input data is overlapped with the bit map data of the form data which was developed in step S8 and is developed (step S9 in FIG. 11), thereby producing the form overlay pattern. The form overlay pattern is transferred to the bit map output section and is printed and output (step S10 in FIG. 11). Alternatively the produced form overlay pattern (303 in FIG. 3, for instance) may also be displayed and output to a display apparatus such as a CRT or the like.

Figure 12:
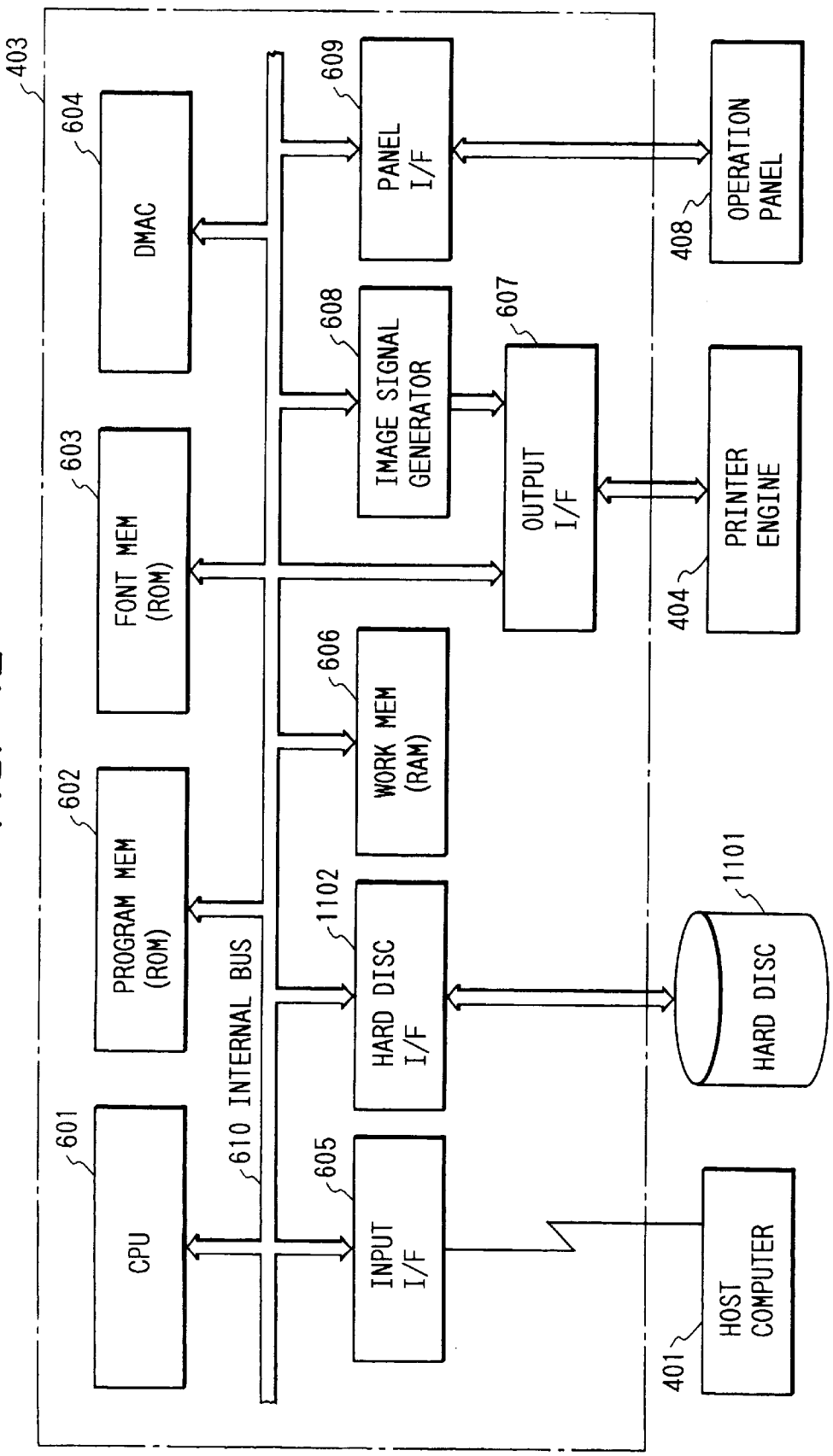
FIG. 12 is a block diagram of the second embodiment of a printer controller.

In the embodiment, the method of converting the form data to the intermediate data and storing into the work memory has been used. However, by connecting a hard disc (1101), an IC card, or the like as a secondary memory device as shown in FIG. 12, the intermediate data of the form data may also be stored into the secondary memory device.

Consequently, since the form data which has been stored once in the secondary memory device is not deleted even if the power source of the printing apparatus is turned on or off, thus a using efficiency of the form is further improved.

A method of managing the form information in the printing apparatus in case of using the secondary memory device is described below with reference to FIGS. 13 and 14.

First, the form data included in the form information transmitted from the host computer is converted to intermediate data and stored as a form file (1204 in FIG. 13) in the secondary memory device (1101).

Figure 13:
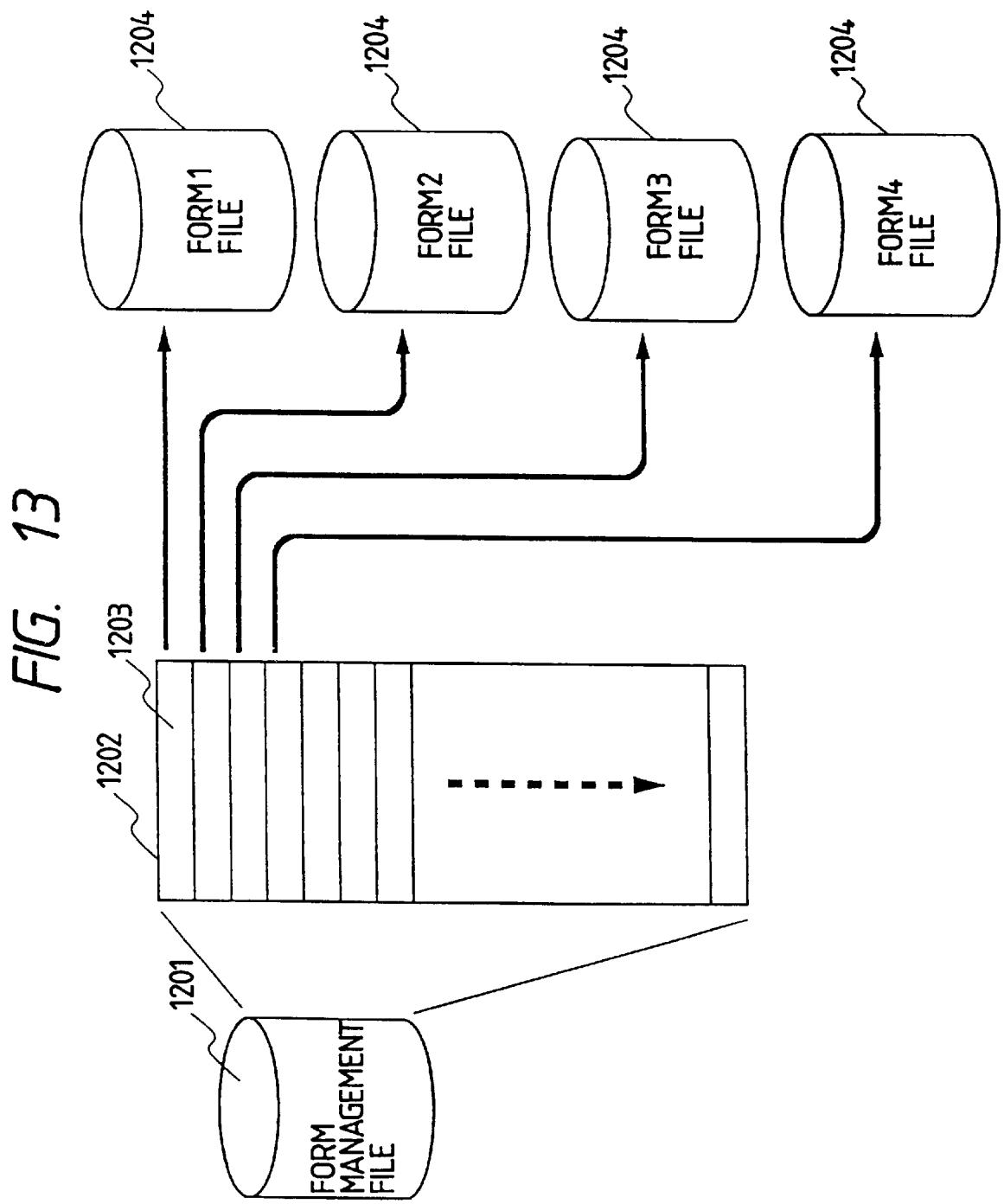
FIG. 13 is a diagram of the second embodiment showing a managing method of managing forms registered in a secondary memory device of the printing apparatus.

Various form files (1204 in FIG. 13) stored in the secondary memory device (1101) are managed by a file management file as shown at 1201 in FIG. 13 and the form management file itself is stored in the secondary memory device (1101). Reference numeral 1202 in FIG. 13 denotes a management record (1203 in FIG. 13) for each form file (1204 in FIG. 13) of the form management file (1201 in FIG. 13).

Figure 14:
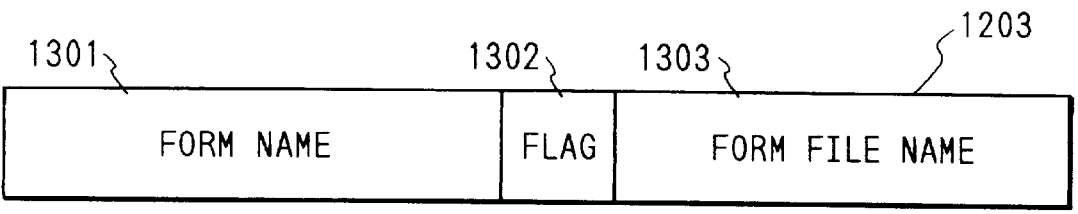
FIG. 14 is a diagram showing an example of a detailed format of a form management record in a form management file according to the second embodiment.

FIG. 14 shows a detailed format of the management record (203) in FIG. 13. Reference numeral 1301 in FIG. 14 denotes a form name designated when the host computer registers the form in the printing apparatus; 1302 an ID flag to discriminate whether the management record is valid or invalid; and 1303 a form file name when the form information is stored in the secondary memory device (1101).

It will be obviously understood that the invention may be realized in a readable/writable secondary memory device such as floppy disk, magnetooptic disk, or the like. The invention may also be realized by using a non-volatile memory.

Figure 15:
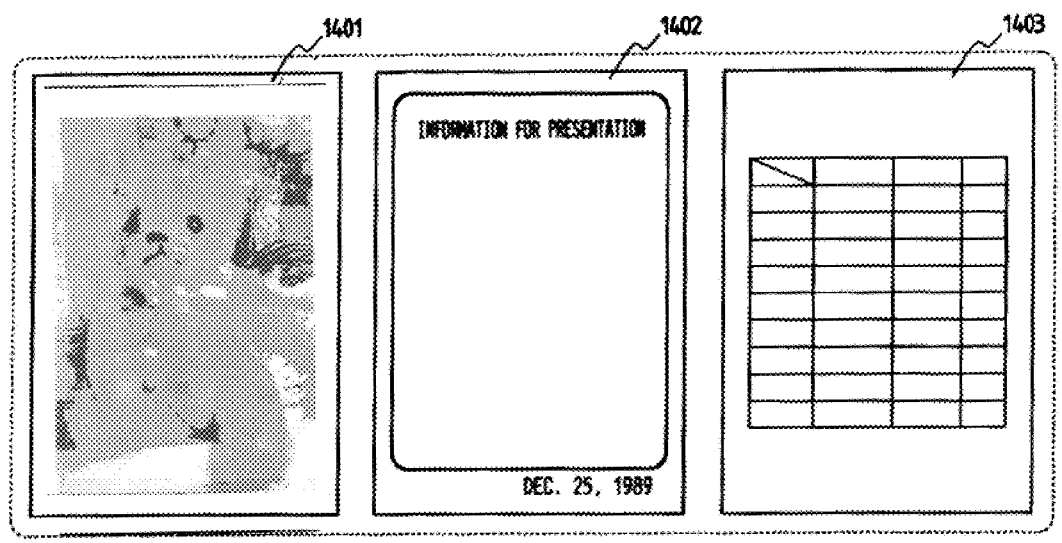
FIG. 15 is a diagram of the second embodiment showing a concept of an overlay of print data and a form.
Figure 16:
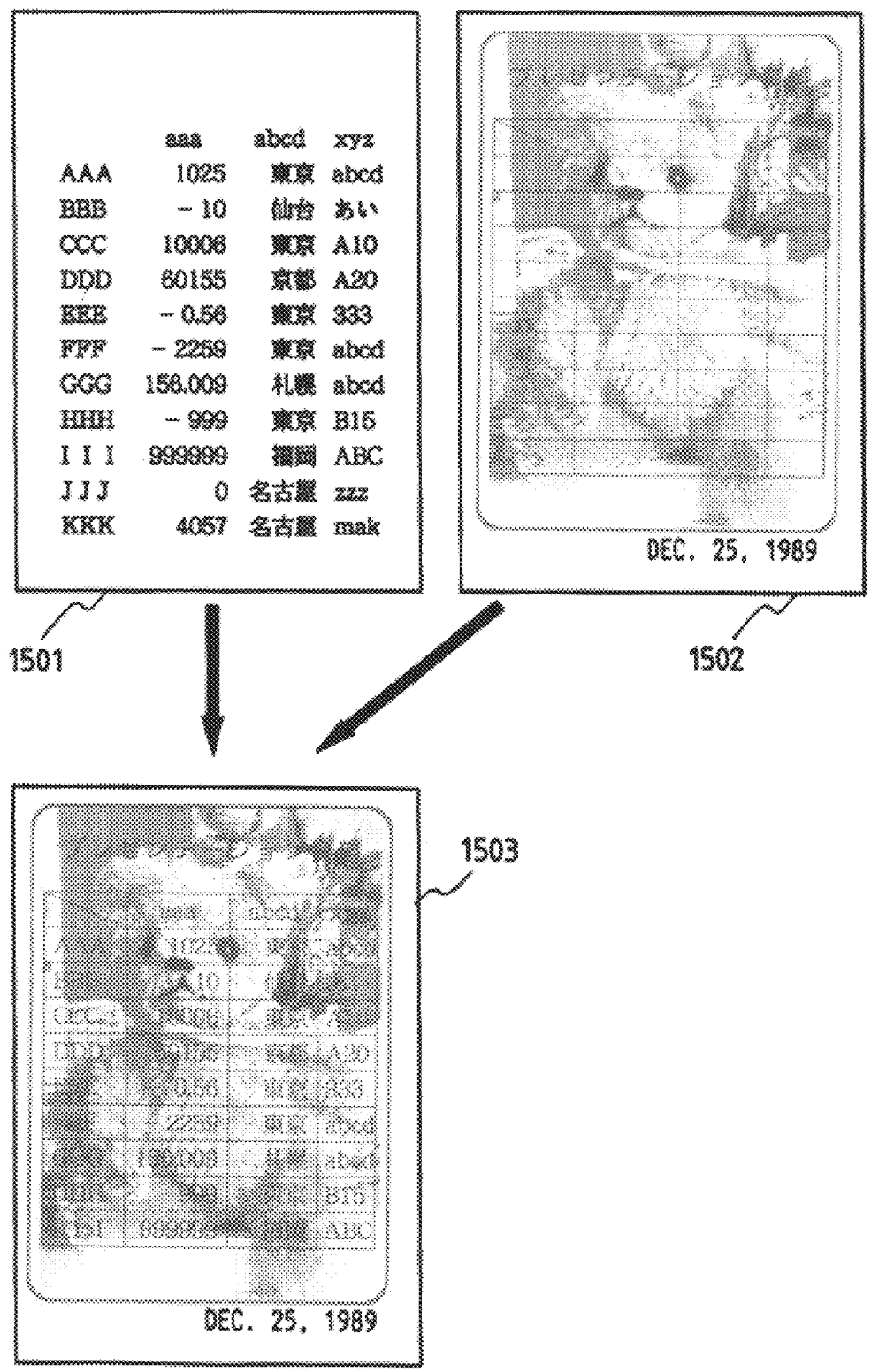
FIG. 16 is a diagram of the second embodiment showing a concept of an overlay of print data and a form.

In the invention, although one form has been overlapped into the input data of one page, a plurality of forms may also be overlapped into the input data of one page as shown in FIGS. 15 and 16. Namely, in the input data analyzer of various command systems provided in the printing apparatus, by registering each form data as input data of the optimum command system, the optimum output result can be derived.

For example, reference numerals 1401, 1402, and 1403 in FIG. 15 show states in which form information of different command systems have been registered. Reference numeral 1502 in FIG. 16 shows a state in which the forms 1401, 1402, and 1403 have been overlapped and developed into a bit map.

Reference numeral 1503 in FIG. 16 shows an output result (form overlay pattern) which is actually output by overlapping the bit map data of input data (1501 in FIG. 16) and the bit map data of the form data 1502.

In the actual printer engine of the printing apparatus for embodying the invention, the bit map data of the page unit is converted to the video signal and is transferred from the input data developer to the printer engine or display mechanism (not shown) and is output. The printer engine may be applied to the following printing apparatuses.

(1) A printing apparatus using an electronic photographing process such that an image corresponding to the bit map data of the page unit is formed on the photosensitive drum by a photosensitive material such as a toner or the like synchronously with the video signal by using a light emitting device such as a laser beam, LED array, liquid crystal shutter, or the like, the formed image is transferred to a sheet (normal paper), and the visible image which was transferred to the sheet (normal paper) is output as a stable print result by using a fixing unit of a high temperature and a high voltage.

(2) A printing apparatus such that an image corresponding to bit map data of a page unit is transferred onto a thermosensible paper by a thermosensing process such as a thermal copy transfer or the like for output of the video signal, thereby outputting a print result.

(3) An image corresponding to the bit map data of a page unit is transferred to a sheet (normal paper) by using a printer engine such as a dot impact ink jet printer or the like for an output of the video signal, thereby outputting a print result.

As described above, in the case where the printing apparatus corresponds to a plurality of command systems, by converting the input data and form data corresponding to various command systems to the intermediate print data that is peculiar to the printing apparatus, it is possible to overlap the input data of the command system (A) and the form data of the command system (B) and to produce and print or display the form overlay pattern.

Consequently, by utilizing the advantages of the command systems, the result (form overlay pattern) in which the print data and form data are overlapped can be output.

What is claimed is:

1. A printing apparatus which generates print data based on input data described in a predetermined printer control language received from an external apparatus and controls a printer engine to print based on the generated print data, said printing apparatus comprising:

first conversion means for converting input image data described in a first printer control language into intermediate image data described in an intermediate language, the first printer control language including a control code for controlling said printing apparatus, the input image data including form designation information designating a form on which the input image data is to be overlayed;

second conversion means for converting input form data describing a plurality of forms, and which is described in a second printer control language into intermediate form data described in the intermediate language, the second printer control language being different in type from the first printer control language;

form memory means for storing, prior to input of the input image data of the first printer control language, the intermediate form data converted from the input form data by said second conversion means; and control means for (a) reading the intermediate form data stored in said form memory means based on the form designation information included in the input image data and converting the read intermediate form data for the designated form into output form data, (b) converting the intermediate image data converted from the input image data by said first conversion means into output image data, (c) overlaying the output image data on the output form data to create a form overlay pattern and (d) controlling the printer engine to print the form overlay pattern.

2. An apparatus according to claim 1, further comprising a printer.

3. An apparatus according to claim 1, further comprising input means for inputting the form data described in the second control language and the input data described in the first control language from the external apparatus.

4. A method carried out in a printing apparatus which generates print data based on input data described in a predetermined printer control language received from an external apparatus and controls a printer engine to print based on the generated print data, said method comprising:

a first step of converting input image data described in a first printer control language into intermediate image data described in an intermediate language, the first printer control language including a control code for controlling said printing apparatus, the input image data including form designation information designating a form on which the input image data is to be overlayed;

a second step of converting input form data describing a plurality of forms, and which is described in a second printer control language into intermediate form data described in the intermediate language, the second printer control language being different in type from the first printer control language;

a form memory step of storing in a form memory, prior to input of the input image data of the first printer control language, the intermediate form data converted from the input form data by said second step of converting; and a third step of (a) reading the intermediate form data stored in said form memory based on the form designation information included in the input image data and converting the read intermediate form data for the designated form into output form data, (b) converting the intermediate image data converted from the input image data in said first converting step into output image data, (c) overlaying the output image data on the output form data to create a form overlay pattern; and (d) controlling the printer to print the form overlay pattern.

5. A method according to claim 4, further comprising the step of:

inputting the form data described in the second control language and the input data into data of the intermediate language described in the first control language from the external apparatus.

6. A memory medium storing a program used in a printing apparatus which generates print data based on input data described in a predetermined printer control language received from an external apparatus, and controls a printer engine to print based on the generated print data, said printing apparatus comprising:

first conversion means for converting input image data described in a first printer control language into intermediate image data described in an intermediate language, the first printer control language including a control code for controlling said printing apparatus, the input image data including form designation information designating a form on which the input image data is to be overlayed;

second conversion means for converting input form data describing a plurality of forms, and which is described in a second printer control language into intermediate form data described in the intermediate language, the second printer control language being different in type from the first printer control language;

form memory means for storing, prior to input of the input image data of the first printer control language, the intermediate form data converted from the input form data by said second conversion means; and control means for (a) reading the intermediate form data stored in said form memory means based on the form designation information included in the input image data and converting the read intermediate form data for the designated form into output form data, (b) converting the intermediate image data converted from the input image data by said first conversion means into output image data, (c) overlaying the output image data on the output form data to create a form overlay pattern and (d) controlling the printer to print the form overlay pattern.

7. A memory medium according to claim 6, further comprising a printer.

8. An apparatus according to claim 6, further comprising input means for inputting the form data described in the second control language and the input data described in the first control language from the external apparatus.

9. A method carried out using a memory medium which stores a program used in a printing apparatus which generates print data based on input data described in a predetermined printer control language received from an external apparatus and controls a printer engine to print based on the generated print data, said method comprising:

a first step of converting input image data described in first printer control language into intermediate image data described in an intermediate language, the first printer control language including a control code for controlling said printing apparatus, the input image data including form designation information designating a form on which the input image information is to be overlayed;

a second step of converting input form data describing a plurality of forms, and which is described in a second printer control language into intermediate form data described in the intermediate language, the second printer control language being different in type from the first printer control language;

a form memory step of storing in a form memory, prior to input of the input image data of the first printer control language, the intermediate form data converted from the input form data by said second step of converting; and a third step of (a) reading the intermediate form data stored in said form memory based on the form designation information included in the input image data and converting the read intermediate form data for the designated form into output form data, (b) converting the intermediate image data converted from the input data in said first step of converting into output image data, (c) overlaying the output image data on the output form data to create a form overlay pattern; and (d) controlling the printer to print the form overlay pattern.

10. A method according to claim 9, further comprising the step of:

inputting the form data described in the second control language and the input data described in the first control language from the external apparatus.

11. A program product used in a printing apparatus which generates print data based on input data described in a predetermined printer control language received from an external apparatus and controls a printer engine to print based on the generated print data, said printing apparatus comprising:

first conversion means for converting input image data described in a first printer control language into intermediate image data described in an intermediate language, the first printer control language including a control code for controlling said printing apparatus, the input image data including form designation information designating a form on which the input image data is to be overlayed;

second conversion means for converting input form data describing a plurality of forms, and which is described in a second printer control language into intermediate form data described in the intermediate language, the second printer control language being different in type from the printer first control language;

form memory means for storing, prior to input of the input image data of the first printer control language, the intermediate form data converted from the input form data by said second conversion means; and control means for (a) reading the intermediate form data stored in said form memory means based on the form designation information included in the input image data and converting the read intermediate form data for the designated form into output form data, (b) converting the intermediate image data converted from the input image data by said first conversion means into output image data, (c) overlaying the output image data on the output form data to create a form overlay pattern and (d) controlling the printer to print the form overlay pattern.

12. A program product according to claim 11, further comprising a printer.

13. A program product according to claim 11, further comprising input means for inputting the form data described in the second control language and the input data described in the first control language from the external apparatus.

14. A method carried out by a program product used in a printing apparatus which generates print data based on input data described in a predetermined printer control language received from an external apparatus and controls a printer engine to print based on the generated print data, said method comprising:

a first step of converting input image data described in a first printer control language into intermediate image data described in an intermediate language, the first printer control language including a control code for controlling said printing apparatus, the input image data including form designation information designating a form on which the input image data is to be overlayed;

a second step of converting input form data describing a plurality of forms, and which is described in a second printer control language into intermediate form data described in the intermediate language, the second printer control language being different in type from the first printer language;

a form memory step of storing in a form memory, prior to input of the input image data of the first printer control language, the intermediate form data converted from the input form data by said second step of converting; and a third step of (a) reading the intermediate form data stored in said form memory based on the form designation information included in the input image data and converting the read intermediate form data for the designated form into output form data, (b) converting the intermediate image data converted from the input data in said first step of converting into output image data, (c) overlaying the output image data on the output form data to create a form overlay pattern; and (d) controlling the printer to print the form overlay pattern.

15. A method according to claim 14, further comprising the step of:

inputting the form data described in the second control language and the input data described in the first control language from the external apparatus.

* * * * *

UNITED STATES PATENT AND TRADEMARK OFFICE
CERTIFICATE OF CORRECTION

PATENT NO. : 6,331,894 B1
DATED : December 18, 2001
INVENTOR(S) : Masaaki Shimizu It is certified that error appears in the above-identified patent and that said Letters Patent is hereby corrected as shown below:

Drawings,
Reference numeral 105 denotes a form storage (RAM) to store the forms registered by the form manager 104.

Fig. 2, the component elements shown by reference numerals 101, 102, 103, 104, and 105 are the same as those in Fig. 1.

Reference numeral 201 denotes an intermediate data developer for developing the intermediate data converted from the input data by the intermediate data converter 103 to the output data (bit map data) of one page. The intermediate data developer 201 also develops form information (intermediate data format) stored in the form storage 105 by overlapping the form into the bit map data produced from the input data through the form manager 104.

Reference numerals 101 to 105 and 201 denote functions in a printer controller of the printing apparatus.

Reference numeral 202 in Fig. 2. denotes an actual printing mechanism section (printer engine) comprising: a printing mechanism for performing a print control; and a control mechanism for executing a feeding control of a sheet feeding system (sheet feeding mode, sheet delivery process) in the printer engine.

A fundamental concept of the invention is shown in FIG. --.

Column 1,
Line 23, "a" (second occurrence) should read -- the --; and
Line 24, "the" should read -- a --.

Column 3,
Line 51, "for FIG." should read -- for registering and managing the intermediate data, as a form, of one page which was converted by the intermediate data converter 103. --

UNITED STATES PATENT AND TRADEMARK OFFICE
CERTIFICATE OF CORRECTION

PATENT NO. : 6,331,894 B1
DATED : December 18, 2001
INVENTOR(S) : Masaaki Shimizu It is certified that error appears in the above-identified patent and that said Letters Patent is hereby corrected as shown below:

<u>Column 4,</u>
Line 10, "registering and managing the intermediate" should be deleted; and
Lines 11-35, should be deleted.

Signed and Sealed this

Twenty-seventh Day of August, 2002

*Attest:*

JAMES E. ROGAN
*Attesting Officer*         *Director of the United States Patent and Trademark Office*